June 23, 1964 R. A. DAVIS 3,138,701

SELF-CHECKING NUMBERING DEVICES

Filed Dec. 29, 1959 9 Sheets-Sheet 1

INVENTOR
RODERIC A. DAVIS
BY
J W Armbruster
ATTORNEY

June 23, 1964 R. A. DAVIS 3,138,701

SELF-CHECKING NUMBERING DEVICES

Filed Dec. 29, 1959 9 Sheets-Sheet 2

June 23, 1964 R. A. DAVIS 3,138,701

SELF-CHECKING NUMBERING DEVICES

Filed Dec. 29, 1959 9 Sheets-Sheet 3

June 23, 1964 R. A. DAVIS 3,138,701

SELF-CHECKING NUMBERING DEVICES

Filed Dec. 29, 1959 9 Sheets-Sheet 4

June 23, 1964 R. A. DAVIS 3,138,701

SELF-CHECKING NUMBERING DEVICES

Filed Dec. 29, 1959 9 Sheets-Sheet 6

June 23, 1964 R. A. DAVIS 3,138,701

SELF-CHECKING NUMBERING DEVICES

Filed Dec. 29, 1959 9 Sheets-Sheet 7

June 23, 1964 R. A. DAVIS 3,138,701

SELF-CHECKING NUMBERING DEVICES

Filed Dec. 29, 1959 9 Sheets-Sheet 9

United States Patent Office 3,138,701

Patented June 23, 1964

3,138,701

SELF-CHECKING NUMBERING DEVICES

Roderic A. Davis, Poughkeepsie, N.Y., assignor to International Business Machines Corporation, New York, N.Y., a corporation of New York Filed Dec. 29, 1959, Ser. No. 862,641
14 Claims. (Cl. 235—153)

Figure 1A:
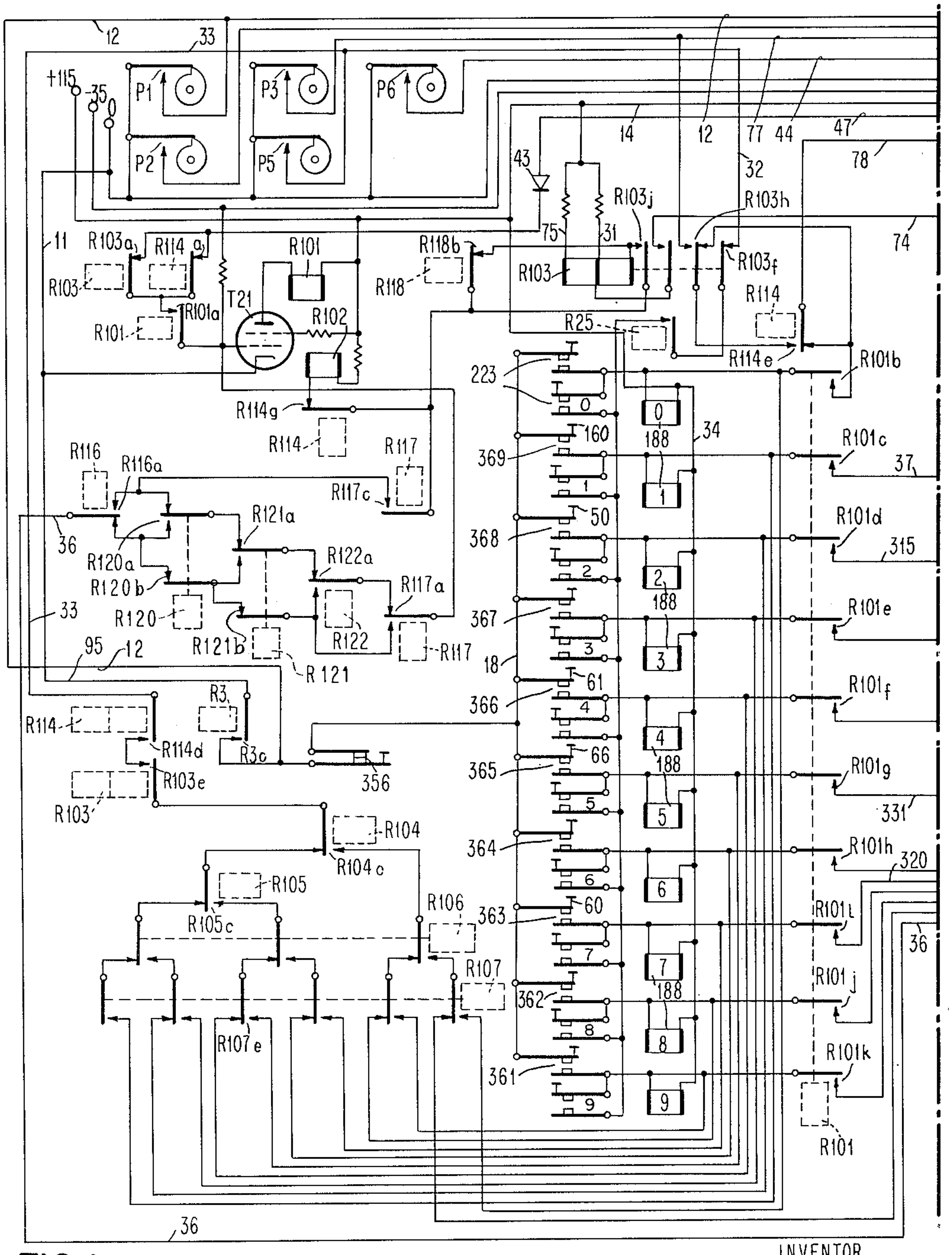

The invention relates in general to error detecting devices and more specifically to apparatus for either preparing a self-checking number or for verifying previously prepared numbers with check digits.

The principal object of the invention is to provide apparatus for accurately reading and recording digital data to and from records such as punched cards.

Another object of the invention is to provide improved means for preparing any number as a self-checking number.

A further object of the invention is to provide apparatus for determining the correctness of prepared serial numbers.

Still another object of the invention is to provide means for appending a key or check digit to an existing number to prevent the number from being altered by wrong digits or digits transposed in subsequent operations.

In carrying out the invention, the value of the key or check digit which is appended to the original number is selected so that upon cross addition of weighted multiples of all the digits of the number and subtraction of the key digit, in accordance with a rule of differential multiplication, the result will be zero with elevens cast out.

In the check system of the present invention, the check digit is created as the numerator of the fractional remainder as in the following calculation (for a six digit field):

$$\frac{7A+6B+5C+4D+3E+2F}{11}$$

Thus if the base number is 127485

$$\frac{(7\times1)+(6\times2)+(5\times7)+(4\times4)+(3\times8)+(2\times5)}{11}=\frac{104}{11}=9\tfrac{5}{11}$$

The check digit will be 5 and the self-checking number will be 1274855.

It would seem that a check system operating as in the above calculation would be extremely complicated requiring the means to produce the two digit products of a series of multiplications, a three position accumulator (for six position field checking) and some means of dividing and determining the remainder. However, the purpose of this invention is to provide simple matrix means of using non-decimal arithmetic to adapt this system for use in recorders and punches. The calculating matrix circuitry developed can be directly substituted for less efficient calculating circuitry in existing self-checking number devices.

Examination of the above noted method of deriving the check digit shows that it is the difference between the sum of the products and the next lower number divisable by eleven. That is, it is the units position of the sum of the products if the number system is to base eleven rather than to base ten. Accordingly, it is possible to determine a check digit by adding only the units digits of the products in a single position or denomination matrix and dropping all carrys therefrom.

The matrix multiplication and addition tables for use in this system may be noted as follows:

*Multiplication Table*

| | ×2 | ×3 | ×4 | ×5 | ×6 | × |
|---|---|---|---|---|---|---|
| 0 | 0 | 0 | 0 | 0 | 0 | 0 |
| 1 | 2 | 3 | 4 | 5 | 6 | 7 |
| 2 | 4 | 6 | 8 | 10 | 1 | 3 |
| 3 | 6 | 9 | 1 | 4 | 7 | 10 |
| 4 | 8 | 1 | 5 | 9 | 2 | 6 |
| 5 | 10 | 4 | 9 | 3 | 8 | 2 |
| 6 | 1 | 7 | 2 | 8 | 3 | 9 |
| 7 | 3 | 10 | 6 | 2 | 9 | 5 |
| 8 | 5 | 2 | 10 | 7 | 4 | 1 |
| 9 | 7 | 5 | 3 | 1 | 10 | 8 |

*Addition Table*

| | 0 | 1 | 2 | 3 | 4 | 5 | 6 | 7 | 8 | 9 | 10 |
|---|---|---|---|---|---|---|---|---|---|---|---|
| 0 | 0 | 1 | 2 | 3 | 4 | 5 | 6 | 7 | 8 | 9 | 10 |
| 1 | 1 | 2 | 3 | 4 | 5 | 6 | 7 | 8 | 9 | 10 | 0 |
| 2 | 2 | 3 | 4 | 5 | 6 | 7 | 8 | 9 | 10 | 0 | 1 |
| 3 | 3 | 4 | 5 | 6 | 7 | 8 | 9 | 10 | 0 | 1 | 2 |
| 4 | 4 | 5 | 6 | 7 | 8 | 9 | 10 | 0 | 1 | 2 | 3 |
| 5 | 5 | 6 | 7 | 8 | 9 | 10 | 0 | 1 | 2 | 3 | 4 |
| 6 | 6 | 7 | 8 | 9 | 10 | 0 | 1 | 2 | 3 | 4 | 5 |
| 7 | 7 | 8 | 9 | 10 | 0 | 1 | 2 | 3 | 4 | 5 | 6 |
| 8 | 8 | 9 | 10 | 0 | 1 | 2 | 3 | 4 | 5 | 6 | 7 |
| 9 | 9 | 10 | 0 | 1 | 2 | 3 | 4 | 5 | 6 | 7 | 8 |
| 10 | 10 | 0 | 1 | 2 | 3 | 4 | 5 | 6 | 7 | 8 | 9 |

Since only ten digit symbols are available, "0" and "10" are used as separate and distinct quantities. In these tables only the units positions of sums and products are shown as they are the only portions which enter into the calculations.

By use of these tables it will now be seen that the check digit of a sample number may be determined as follows:

| | Products | Progressive Total |
|---|---|---|
| Assuming that the sample number is 12345 | 1×7=7 | 0+7=7 |
| | 2×6=1 | 7+1=8 |
| | 3×5=4 | 8+4=1 |
| | 4×4=5 | 1+5=6 |
| | 5×3=4 | 6+4=10 |

Therefore the check digit is 0 and the full self-checking number is 123450.

It may be noted that since no eleventh digit symbol is available in the decimal system, a check digit of "10" is to be represented by "0."

In checking a self-checking number the operation will proceed in exactly the same manner as for developing the check digit, with the addition of one more step. Since the check digit is known and available it is keyed in and subtracted from the total in the counter. If this produces a zero balance, the number checks; if it does not produce a zero balance there is an error.

Another object of the present invention is the provision of checking controls involving weighting of successive demonimations in such a fashion that the very first digit is weighted with a comparatively large prime number as a multiplier. When the check weighting multipliers are 2, 3, 4, 5, 6 and 7 is is advantageous to use the 7 as the starting or initial weight factor in preference to a smaller digit or an even digit. Transposition errors in short numbers are detected in greater proportions with a large prime initiating factor. Therefore, 7, 6, 5, 4, 3, 2, 7, 6, 5 . . . etc. is the sequence of multipliers used in forming weighting factors for creating a check digit.

The multipliers are assigned in descending order from left to right starting with the highest order significant position of the base number. If the base number exceeds six positions, the use of the same multipliers is repeated in the same order. The only multipliers are 2–3–4–5–6 and 7.

Example 1:
    Number ABCDEF—F is the check digit
    Multipliers 7–6–5–4–3, respectively
Example 2:
    Number ABCD—D is the check digit
    Multipliers 7–6–5, respectively
Example 3:
    Number ABCDEFGHIJ—J is the check digit
    Multipliers 7–6–5–4–3–2–7–6–5, respectively Cross adding the digits of the multiplied numbers with elevens cast out, the remainder digit is the key or check digit to be calculated with the original number. Thus, in the example of 1–2–3–4–5, the cross addition with elevens cast out provided a remainder of 10 which is a key figure 0, so that the original number with its key 0 may be recorded as 1–2–3–4–5–0 which when calculated upon subsequent reentry, will result in a total of zero as an error free number.

From the foregoing, it will be apparent that upon cross addition of the units digits of the weighted multiplies of original number digits with elevens cast out as before, and the formed key digit included as a value to be subtracted, the result will be zero. If the result is other than zero, it is an indication of an error in the handling of the digits of the original number.

A still further object of the invention is to provide novel multiplying means for automatically originating a key or check digit for any number.

The foregoing and other objects, features and advantages of the invention will be apparent from the following more particular description of a preferred embodiment of the invention, as illustrated in the accompanying drawings.

Figure 2:
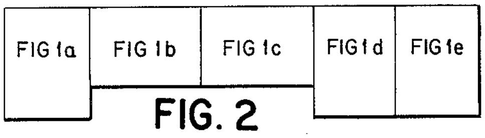

In the drawings:

FIGS. 1*a*–1*e*, when arranged horizontally from left to right as indicated in FIG. 2, constitute a wiring diagram of the self-checking apparatus in a card punch.

FIG. 2 is a chart showing how wiring drawings FIGS. 1*a*–1*e* are to be arranged.

FIGS. 2*a*–2*d*, when disposed in a vertical fashion in the order named, represent seven cycles of timing to perform a complete operation involving the number 127485 and its check digit 5. These are punched in the order mentioned, with the first six cycles being key initiated to punch the corresponding 127485, and the last cycle being the result of the key digit calculation whereupon the 5 is punched as the formed check symbol.

When used in an elementary form and in a purely mechanical fashion, the modulus eleven for checking is pointed out as desirable in a number of expired patents such as 1,283,293; 1,519,328; 1,528,567; 1,758,172 and 1,810,329. However, here the elevens checking is done by means of an advanced matrix style control and in conjunction with weighted multiples of 7, 6, 5, 4, 3, and 2.

The mechanical arrangement of the card feeding mechanism, card reading mechanism, the escapement mechanism, and the punching mechanism used in conjunction with the present invention is substantially the same as that found in the commercial machine known as the "IBM" Card Punch, Type 024", which is also described and claimed in patent application Serial No. 103,224, of E. W. Gardinor et al., filed July 6, 1949 which issued as Patent 2,647,581 on August 4, 1953.

The invention is illustrated as embodied in a punching control device as set forth in the Luhn Patent 2,731,196 for a self-checking number punch, filed November 14, 1951 and issued January 17, 1956. The patent discloses a rule of substitution involving doubling of alternate digits of a number and casting out tens. In the present instance, a series of digits of a number are weighted by multiplication by 7, 6, 5, 4, 3 and 2, in sequence and cross added with elevens cast out. Here, there is the advantage of differently weighting six successive digits (with transposition errors caught) without requiring elaborate multiplying and dividing means.

It is believed that the present invention may be best set forth by describing the invention as actually employed with the machine of the aforementioned Gardinor and Luhn punch patents. In those instances where the circuit elements of the patents become effective in conjunction with the circuit arrangement of the present invention, the reference numbers used to identify such circuit elements in the aforementioned patents will be used.

It is also believed that the applicant's circuit arrangement can be best described in reference to a specific problem in which the key or check number is originated. Let it be assumed that it is desired to originate the key number of a postal money order bearing the Serial Number 127,485, which operation should produce a check or key digit 5 in the units digit position of the serial number. Likewise let it be assumed that the program card is standing in column one position having the "9" index position perforated. It is to be noted that this program card operates in a manner similar to operation of the program card shown in FIG. 49 of the Gardinor Patent 2,647,581.

The program card for the problem assumed will have the index positions "12 and 8" perforated in the second column, the index positions "12 and 7" perforated in the third column, the index positions "12 and 6" in the fourth column, the index positions "12 and 5" perforated in the fifth column, the index positions "12 and 4" perforated in the sixth column, and the index positions "12 and 9" perforated in the seventh column, etc. By means of such program card control it will be pointed out later how recurring series of multiplications are performed involving multiplication by 7, 6, 5, 4, 3, 2 and repetitions thereof as the program card is scanned from the column one position to any other column position depending on the length of the number and the number of denominations involved. From the foregoing it may be gathered that the 9 perforation in the program card controls multiplication by 7, the 8 perforation controls multiplication by 6, the 7 perforation controls multiplication by 5, the 6 perforation controls multiplication by 4, the 5 perforation controls multiplication by 3, the 4 perforation controls multiplication by 2, and repetitions thereof.

Now continuing with the assumptions being made with regard to the specific problem, the detail card is registered at the zero column position in a manner such as described in the Gardinor Patent 2,647,581. Inasmuch as it is desired to originate a key or check number, the switch 20 (FIG. 1*e*) will be closed thereby causing the relay R114 (FIG. 1*e*) to be energized over the circuit, zero volt line 12, switch 20, relay R114, wire 88, and line 14 (FIGS. 1*e* to 1*a*) to the 115 volt terminal hub. The relay R114 will remain energized as long as the switch 20 is in a closed position. In the problem assumed the switch 20 remains closed until after the key digit is originated. The switch 20 in its open position conditions the circuit for checking the accuracy of a previously prepared serial number having appended thereto a key or check digit. Thus with the program card standing in the column one position, the "9" perforated index position will permit the #9 star-wheel (245 in FIG. 26 of the Gardinor patent) to close the associated contacts 246 (FIG. 1*d*). The closing of contacts 246 will enable a circuit to be established which may be traced as follows: conductor 11 (FIG. 1*a*) coupled to the low side or 0 volt line of a power supply source (not shown) conductor 95, the card lever contacts R3*c* now closed (presence of a card causes relay R3 to be operated), line 12 (FIGS. 1*a* to 1*d*) error delay contacts R113 normally closed, #9 star-wheel contacts 245 now closed, the negatively biased control grid of the tube T20, the anode of the tube T20, relay R116, contacts R25*d* normally closed, conductor 13, to the positive line 14 of the 115 volt power supply source. The tube T20 is negatively biased through the coupling of its control grid to the conductor 96 which is coupled to a —35 volt power source (not shown). This circuit upon being completed will cause the tube T20 to be rendered conductive which, in turn, results in the relay R116 being energized. The energization of relay R116 will transfer the associated contacts R116*a* (FIG. 1*a*) causing a circuit to be established for rendering the negatively biased tube T21 (FIG. 1*a*) conductive which, in turn, will cause the relay R101 (FIG. 1*a*) to be energized. This circuit may be traced as follows: conductor 11 (FIG. 1*e*), conductor 16, release relay contacts R1*d* as shown, line 36 (FIGS. 1*e* to 1*a*), R116*a* transferred, R120*a*, R121*a*, R122*a* and R117*a* as shown, control grid of the negatively biased tube T21, the anode of the tube T21, relay R101, to the conductor 14.

Figure 1B:
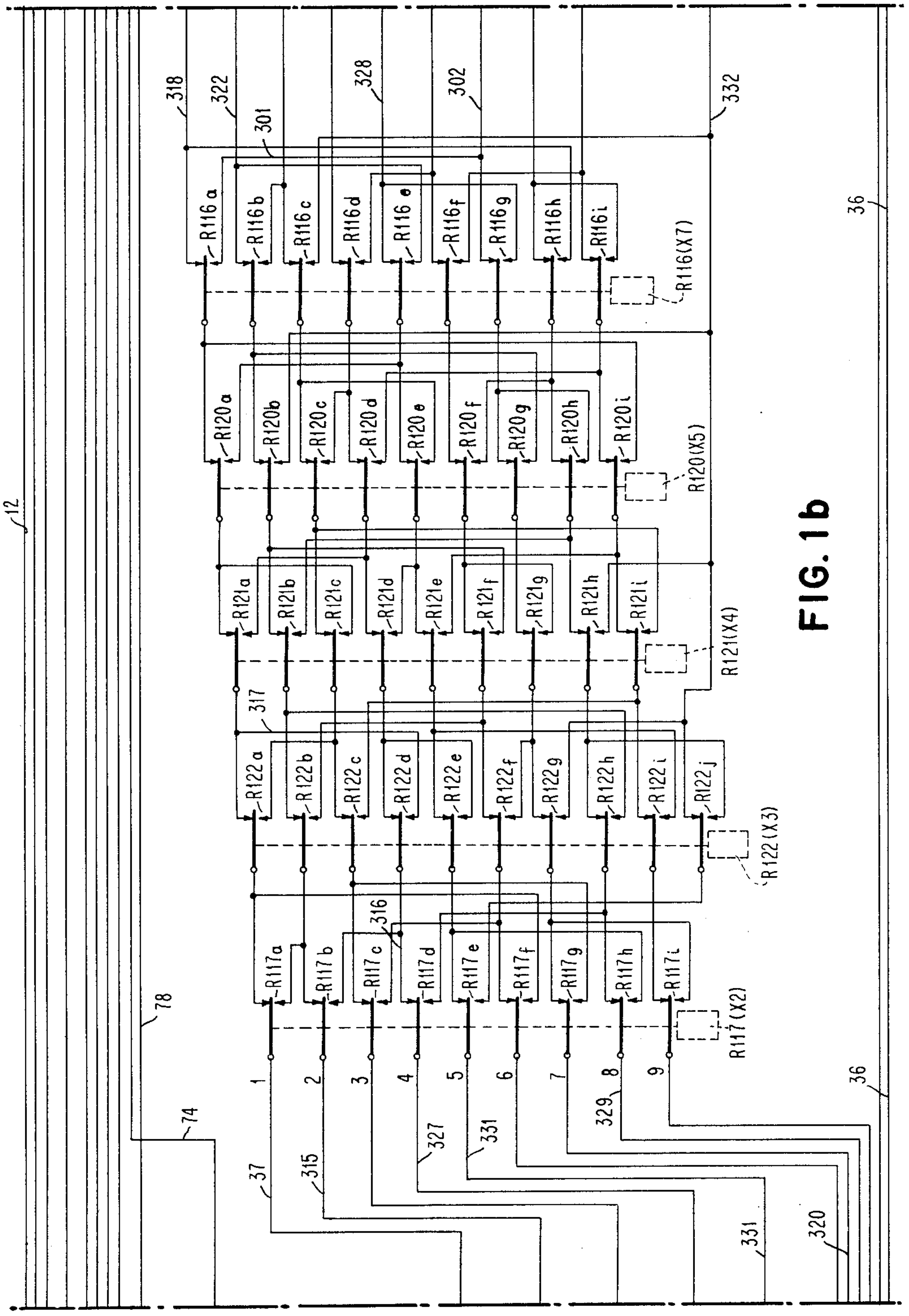
Figure 1C:
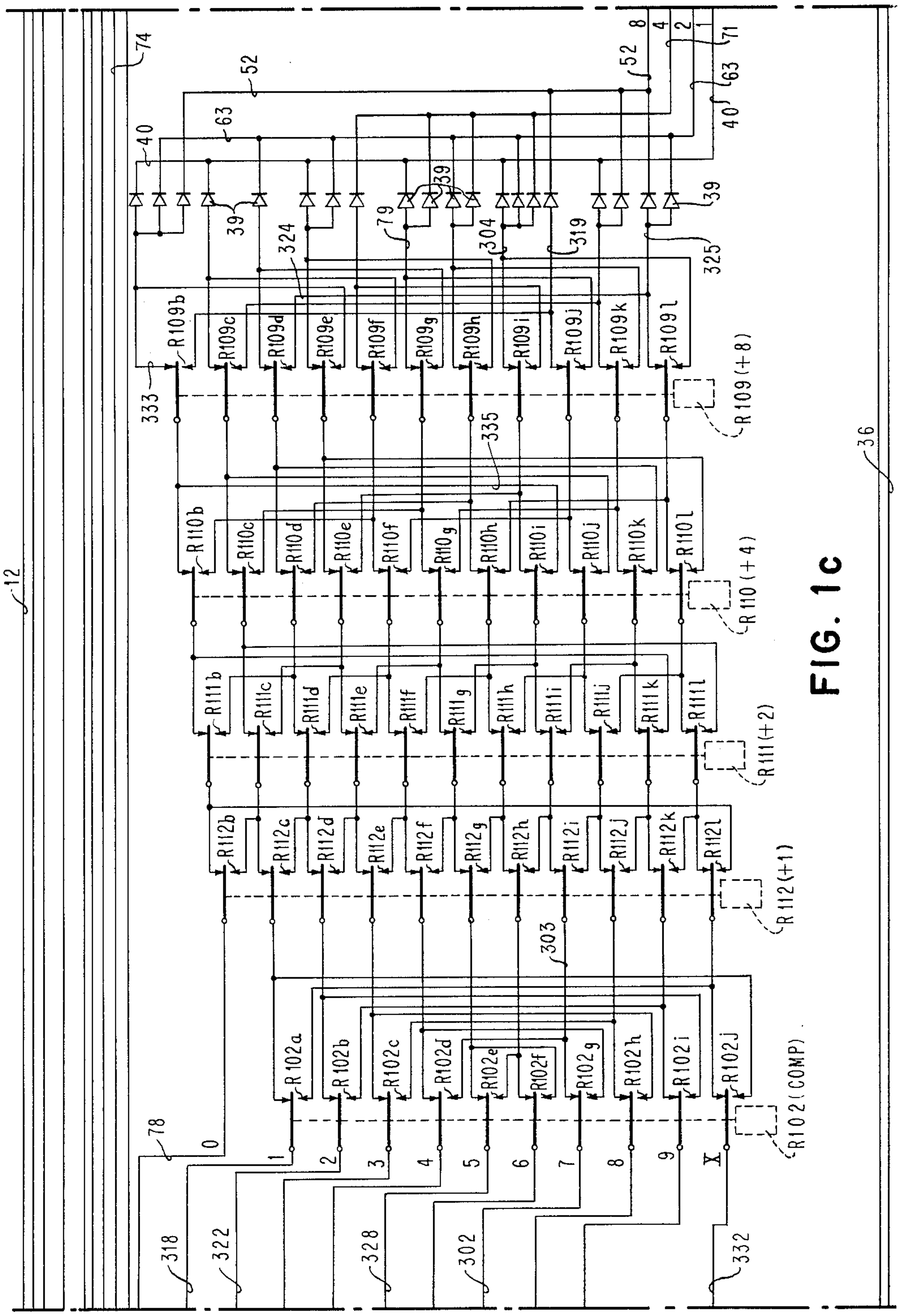
Figure 1D:
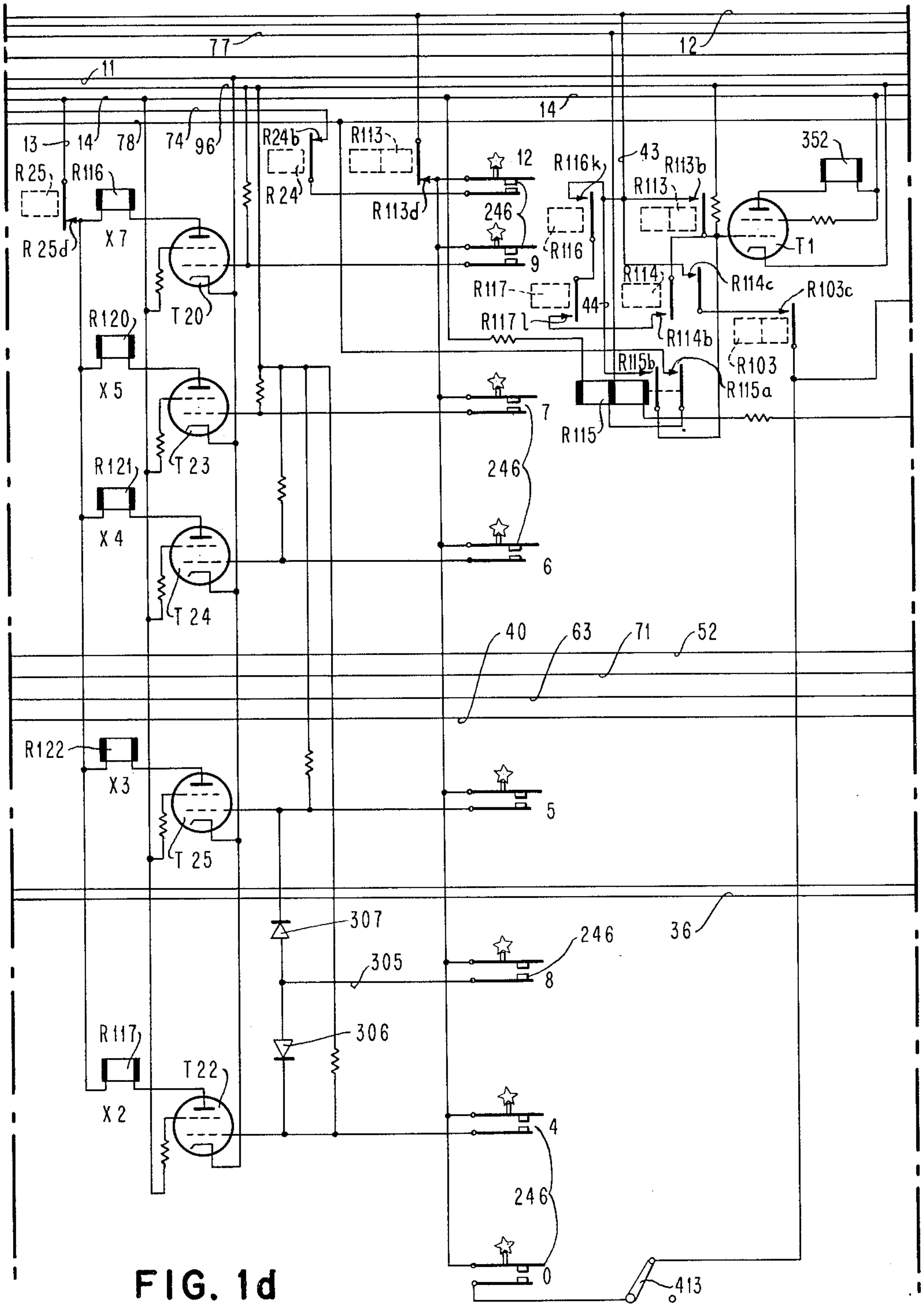
Figure 1E:
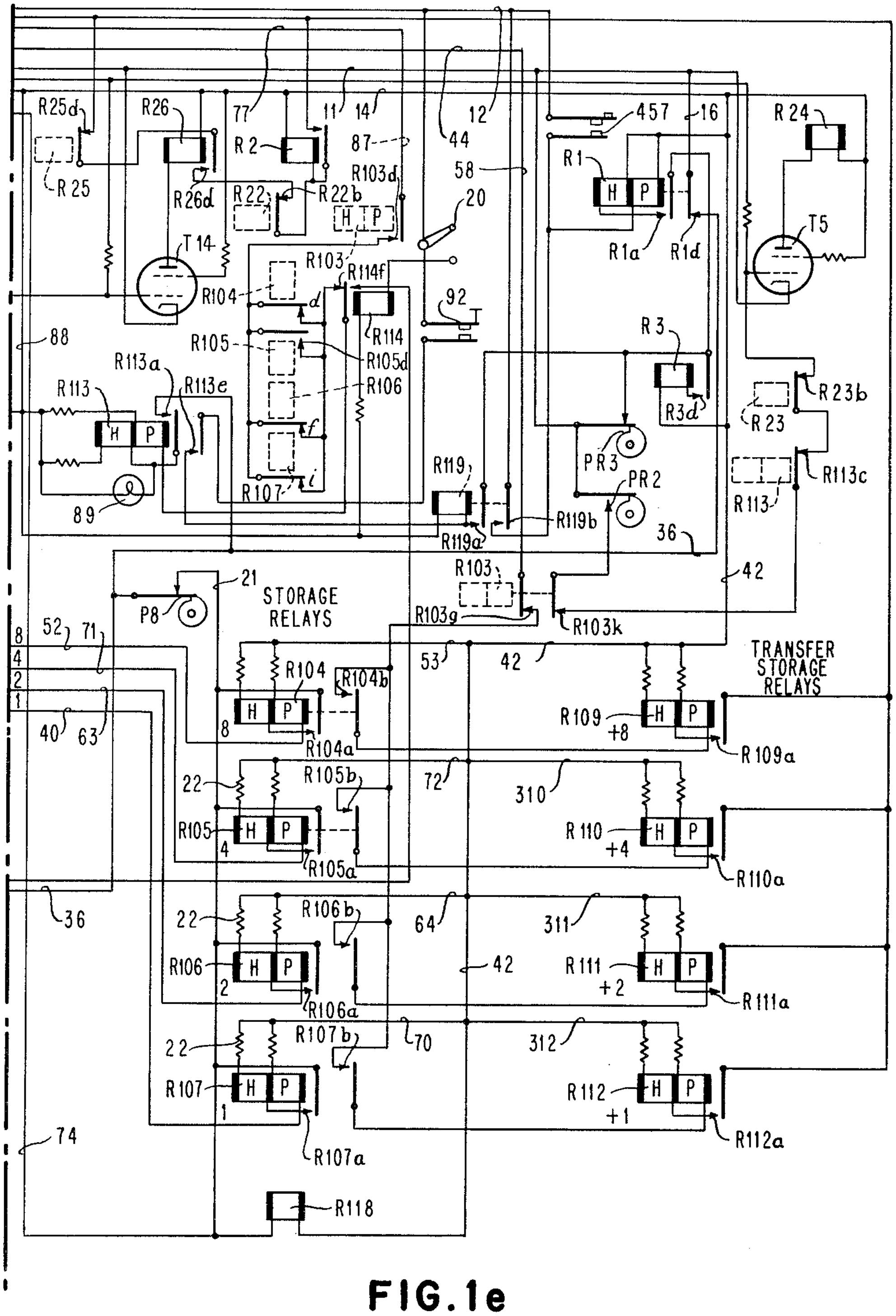
Figure 2A:
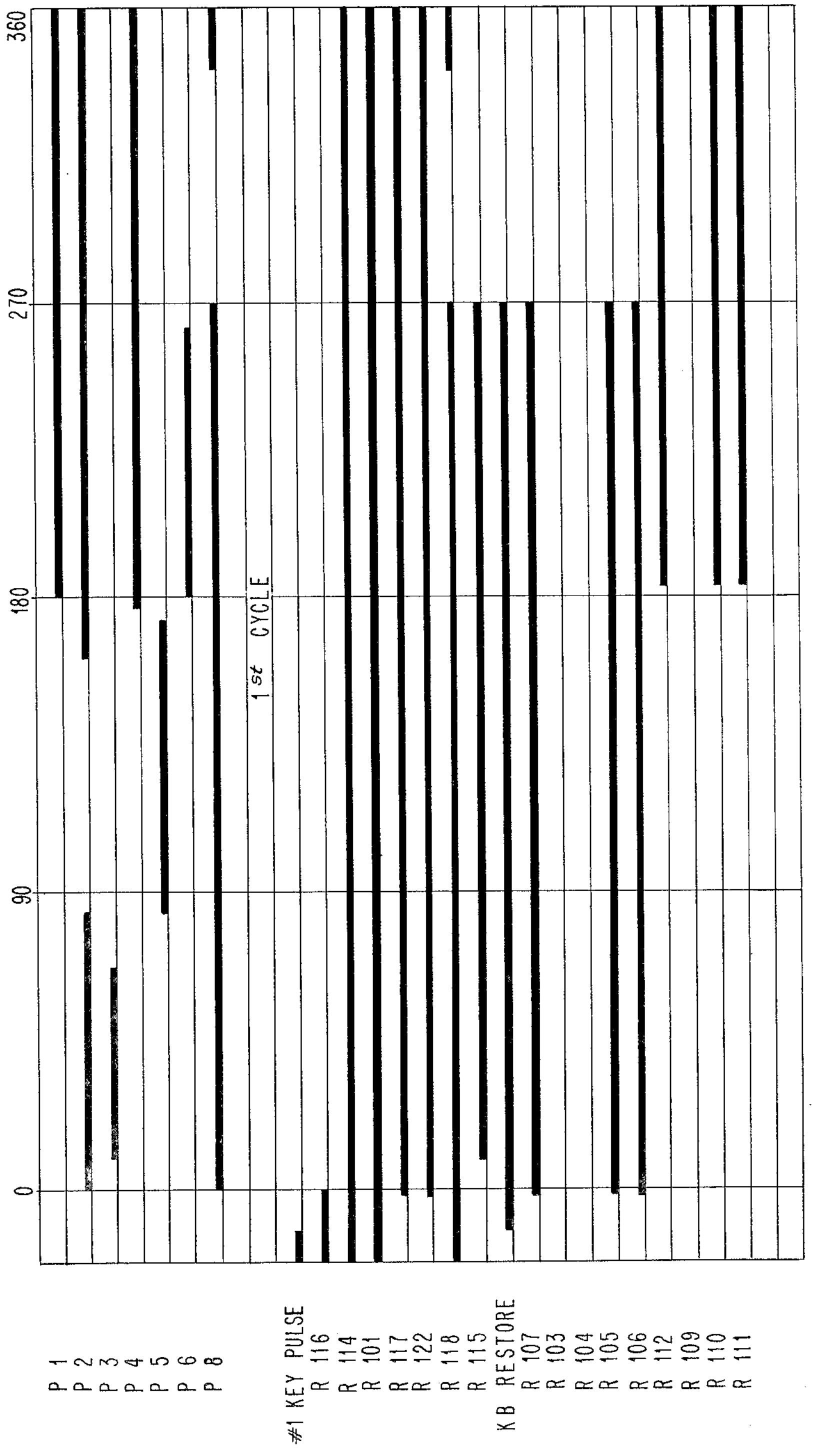

Thus it is to be noted from the timing diagram of FIG. 2*a* that prior to depressing the key to punch the highest order digit of the serial number in column one of the detail card, the relays R101, R116 and R114 will be in an energized condition due to the sensing of the "9" perforation in the program card and the closing of the switch 20. Since the Serial Number 127,485 of the assumed problem bears a digit 1 in the highest order position, it will be necessary for the operator to depress the 1 key 160 (FIG. 1*a*) in order to enter this digit in the record card. The depression of this key will set up a pair of circuits. The first of these circuits which will cause the storage relay R107 (FIG. 1*e*) to be energized may be traced as follows: line 11 (FIG. 1*a*), conductor 95, card lever contacts R3*c* now closed, keyboard restore contacts 356 normally closed, conductor 18, the 1 key contacts 369 now closed, conductor 37 (FIGS. 1*a* to 1*b*) normally closed contacts R117*a*, R122*a*, R121*a*, R120*a* (relating to times 2, times 3, times 4 and times 5 not now used) and normally open times 7 contacts R116*a*, wires 301 and 302, FIG. 1*c*, normally closed subtraction contacts R102*g*, wire 303, add contacts R112*i*, R111*i*, R110*i*, R109*i*, wire 304, three rectifiers 39 to lines 40, 63 and 71, FIGS. 1*c* to 1*e*, relays R107, R106 and R105 to store values 1, 2, 4, respectively, adding to 7, and conductor 42 to line 14. A hold circuit for relays R107, R106 and R105 will be established by the cam controlled contacts P8 (FIG. 1*e*) which may be traced as follows: conductor 11 (FIG. 1*e*) conductor 16, contacts R1*d* as shown, wire 36, cam controlled contacts P8 in a make position at this time as shown in the timing diagram of FIG. 2*a*, line 21, contacts R107*a*, R106*a* and R105*a* now closed, the hold coil of the same relays, the 2500 ohm resistors 22, lines 41, 64 and 72, conductor 42, and then to conductor 14. Thus the "1" of the key entry is multiplied by 7 by the matrix of FIGS. 1*b* and 1*c* and stored as shown in FIG. 1*e*. It is to be noted that the relay R118 (FIG. 1*e*) which is in parallel with the hold coil of the relay R107 will also be picked up by cam controlled contacts P8 at this time.

The second circuit established when the 1 key contacts 369 are closed will be the same as just described up to contacts R101*c* (FIG. 1*a*), from which position it branches off to cause the energization of the 1 interposer magnet 188. As brought out in the aforementioned patent of Gardinor et al. and as now shown in this application, the energization of the 1 interposer magnet 188 unlatches its associated punch interposer which latches on the punch bail and closes the bail contacts. As the interposer bail contacts close they energize the escapement magnet 104 (FIG. 47*b* of the Gardinor patent) causing the program card to escape to column two while the detail card will escape to column one. Likewise as pointed out in the Gardinor patent the energization of the interposer magnet 188 will cause the punch clutch magnet 204 (FIG. 47*c* of the Gardinor patent) to be energized thereby initiating a punch clutch cycle, resulting in the digit 1 being punched in column one of the detail card.

When the program card escapes to column two the #9 star-wheel contacts (FIG. 1*d*) will open causing the relay R116 to be de-energized. Likewise when the program card escapes to column two the #12 star-wheel will detect a perforation in the "12" index point position causing the corresponding contacts 246 (FIG. 1*d*) to be closed and thereby establishing a hold circuit for the relay R101 to sustain checking operation. This hold circuit may be traced as follows: conductor 12 (FIG. 1*d*), normally closed error relay contacts R113*d*, #12 star-wheel contacts 246 now closed, contacts R24*b* normally closed, conductor 47 (FIGS. 1*d* to 1*a*), rectifier 43, contacts R103*a* normally closed, R101*a* now closed, the tube T21, the relay R101, to the conductor 14.

The #8 star-wheel (FIG. 1*d*) upon detecting the "8" perforation in the second column of the program card, will close the corresponding contact 246 to complete a circuit for energizing the relays R117 and R122 for multiplying by 2 and 3, respectively or equivalent to multiplying by 6 as the second weighting step of the 7, 6, 5, 4, 3, 2 series. This circuit may be traced as follows: conductor 12 (FIG. 1*d*), contacts R113*d* normally closed, #8 star-wheel contacts 246 now closed, wire 305, rectifiers 306 and 307, the negatively biased tubes T22, and T25, relays R117 and R122, contacts R25*d* normally closed, to the conductor 14. The energization of the relay R117 will close the corresponding contacts R117*c* (FIG. 1*a*) thereby preparing a circuit for energizing the subtraction or complemented relay R102 (FIG. 1*a*), which is ineffective at this time and must await joint action of R117 and R116 on the seventh cycle for check symbol value inversion, i.e. to subtract the check value to arrive at zero when correct.

With the multiplier matrix relays R117 and R122 energized, they cause closure of their contacts in FIG. 1*b* and cause the next following key pulse to be re-routed into the summation circuit. The re-routing will cause the 2 key pulse to be applied to the summation circuit as equivalent to a $(2\times6=12-11=1)$ key pulse; or equivalent to a 1 key pulse.

With the initiation of a punch clutch cycle, the punch shaft will rotate causing the cams P1, P2, P3, P4, P5, P6, P7, and P8 to make and break such as shown in the timing diagram of FIG. 2*a*. During the first cycle when the cam control contacts P3 make at 10° machine time, the keyboard restore interlock relay R115 (FIG. 1*b*) will be energized through an obvious circuit. The energization of this relay R115 closes the corresponding contacts R115*b* (FIG. 1*d*) which enable the circuit to be established for energizing the keyboard restore relay 352 (see FIG. 47*b* of the Gardinor patent). The circuit completed for energizing the keyboard restore relay 352 may be traced as follows: conductor 12 (FIG. 1*d*), conductor 43, conductor 44, now closed contacts R115*b*, the tube T1, the keyboard restore relay 352, and then to conductor 14. The keyboard restore interlock relay R115 retains the keyboard restore magnet 352 in an energized condition in order to prevent the operator from depressing a key in the middle of a cycle.

When the cam controlled contacts P6 make at 180° of the first cycle, the 7 value standing in the storage relays R106 and R105 and R107 (FIG. 1*e*) will be transferred into the transfer storage relays R112, R111 and R110 (FIG. 1*e*). This circuit may be traced from the line 44 (FIG. 1*e*) which is coupled to the contacts P6 as follows: line 58, contacts R103*g* normally closed, contacts R107*b*, R106*b* and R105*b* now closed, pick-up coils of relays R112, R111 and R110, conductors 312, 311 and 310, conductor 42, to line 14. This circuit just traced will result in the relays R112, R111 and R110 being energized. A hold circuit for the three relays is established by the cam controlled contacts P2 through the contacts R112*a*, R111*a* and R110*a* (FIG. 1*e*).

When the cam controlled contacts P8 break at 270° of the first cycle, the hold circuit for the relays R107, R106 and R105 and the circuit for the relay R118 will be broken such as shown in the timing diagram of FIG. 2*a*. When P8 makes again at 340° of the first cycle, the relay R118 will be picked up again. As described in the aforementioned Gardinor patent, at the end of the first cycle the punch clutch relatches thus causing the rotation of the punch shaft to be brought to a halt.

Figure 2B:
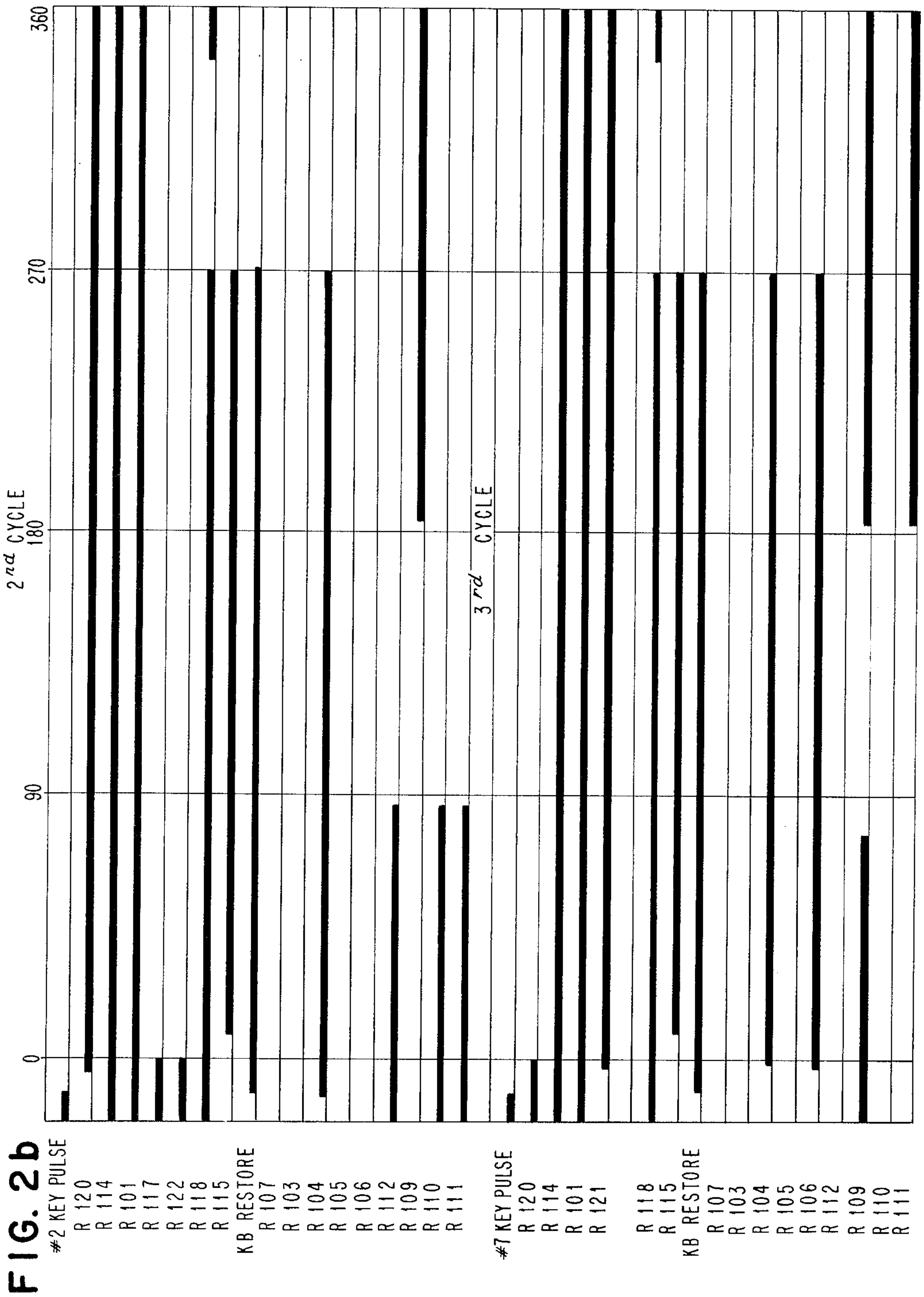
Figure 2C:
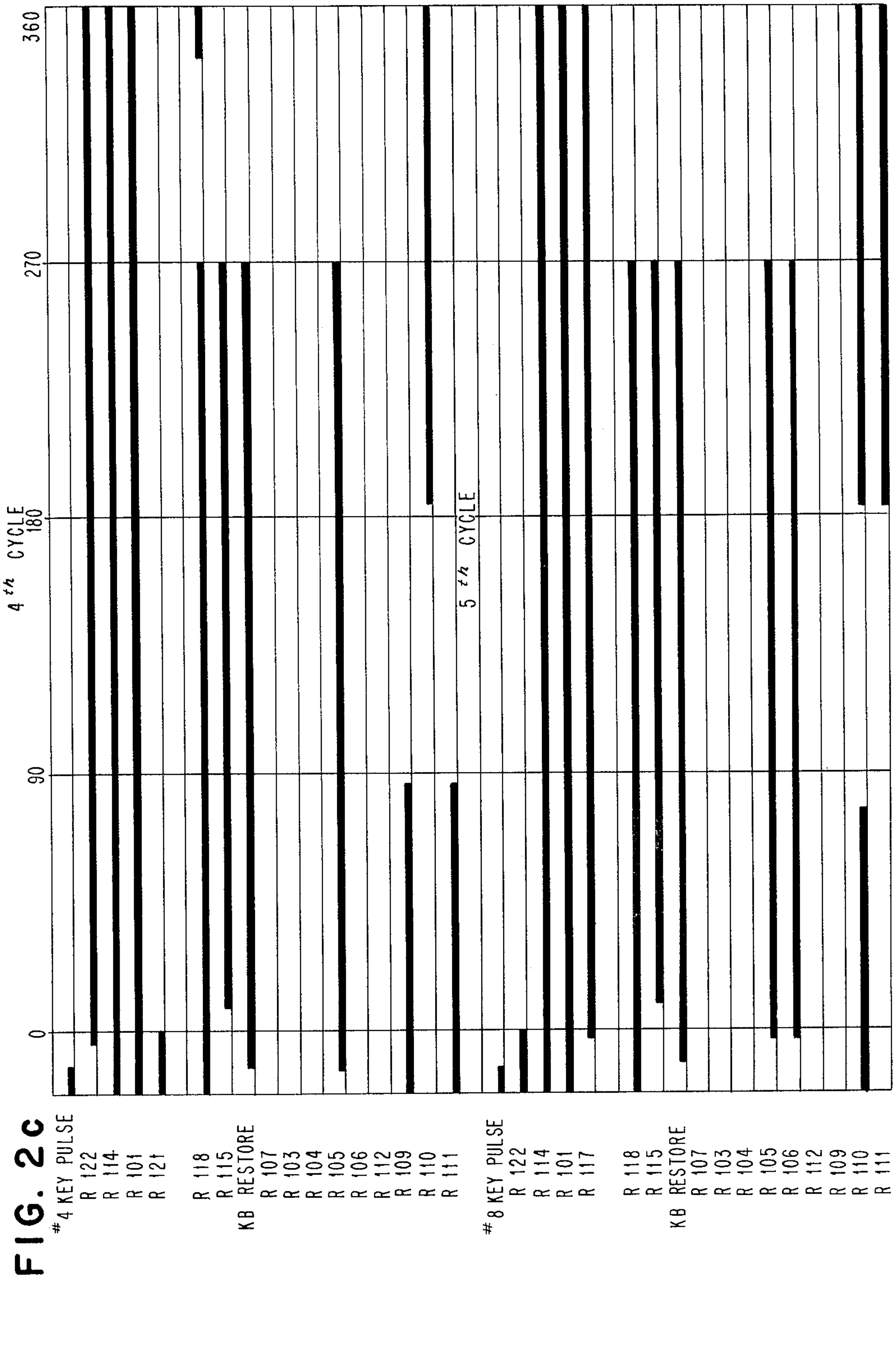

Prior to depressing the 2 key 50 (FIG. 1*a*) to commence the second cycle, it is to be noted from the timing diagram of FIG. 2*b* that the relays R114, R117, R122, R101, R118 and R112 are all in an energized condition. Now when the operator depresses the 2 key 50 (FIG. 1*a*) in order to punch the next lower order digit 2 of the serial number in column two of the detail card, a pair of circuits will be established. As previously point out, one of the circuits will cause the 2 interposer magnet 188 (FIG. 1*a*) to be energized thereby causing the program card to escape to column three, the detail card to escape to column two, and the punch magnet to cause the digit 2 to be punched in the detail card after the detail card escapes to column two. The escapement of the program card to the third column will result in the #12 and #7 star-wheels detecting perforations in the corresponding index positions. As previously described, the #12 star-wheel will, upon detecting the perforation in the "12" index position of the third column of the program card, close the corresponding contacts 246 (FIG. 1*d*) causing a hold circuit to be established for the relay R101. Also as previously pointed out, when the #7 star-wheel senses the "7" perforation in the third column of the program card, the corresponding contacts 246 will be closed causing the relay R120 (FIG. 1*d*) to be energized, but inasmuch as the relay R101 is being held at this time, the completion of a circuit for the energization of the relay R120 will have no effect at this time.

The second circuit which is established when the 2 key 50 is depressed may be traced as follows: conductor 11 (FIG. 1*a*), card lever contacts R3*c* now closed, contacts 356 normally closed, conductor 18, 2 key contacts 368 now closed, contacts R101*d* now closed, conductor 315 (FIGS. 1*a* and 1*b*) shifted contacts R117*b*, wire 316, shifted contacts R122*d*, wire 317, normally closed R121*a*, R120*a* and R116*a*, wire 318 (which is a value "1" wire properly representing $2\times6=12-11=1$). The "1" pulse thru wire 318 (FIG. 1*c*) passes through normally closed R102*a*, shifted R112*c*, shifted R111*d*, shifted R110*f*, normal R109*j*, wire 319, corresponding rectifier 39, line 52 (FIGS. 1*c* to 1*e*), to the storage relay R104, conductors 53 and 42, to the conductor 14. The energization of the relay R104, which is equivalent to the value 8, is due to the relay matrix multiplication, casting out and summation of the $2\times6$ with 11 cast out, i.e., *a*1, representative of the number 2, to the 7 value, as represented by the relays R112, R111 and R110 being energized, which 7 was entered in the first cycle. The storage relays R104, R105, R106, R107, and R103 are respectively equivalent to the values 8, 4, 2, 1 and 0. The transfer storage and adding relays R109, R110, R111, and R112 (FIG. 1*e*) are respectively equivalent to the values 8, 4, 2, and 1. The multiplier relays R117, R122, R121, R120 and R116 are controlling for times 2, 3, 4, 5, and 7, respectively, $\times6$ being arrived at by using both 2 and 3 as multipliers.

As previously described, a hold circuit is established for the relay R104 when the cam controlled contacts P8 make. The energization of the interposer magnet will result in the unlatching of the punch clutch causing the rotation of the P cams such that, when the cam contacts P3 close at 10° of the second cycle, a circuit will be established for energizing the relay R115. As described previously, the energization of the relay R115 will close the corresponding contacts R115*b* (FIG. 1*d*) thereby causing a circuit to be completed for energizing the keyboard restore magnet 352. When the cam controlled contacts P2 break at 85° of the second cycle, the hold circuit for the relays R112, R111 and R110 will be broken causing all three relays to be returned to a de-energized condition as shown in the timing diagram of FIG. 2*b*.

At 180° of the second cycle when the cam controlled contacts P6 close, the value standing in the relay R104 will be transferred to the relay R109, which relay is representative of an 8 value. This circuit may be traced from the cam controlled contacts P6, conductor 44 (FIG. 1*e*) as follows: conductor 53 (FIG. 1*e*), contacts R103*g* normally closed, contacts R104*b* now closed, pick-up coil of the relay R109, conductor 42, to the line 14. A hold circuit for the relay R109 is established by the cam controlled contacts P2 through the corresponding contacts R109*a*. When the cam controlled contacts P8 break at 270° of the second cycle, relays R104 and R118 will be de-energized such as shown in the timing diagram of FIG. 2*b*. The relay R118 will be energized again at the end of the second cycle when the cam controlled contacts P8 make. The relay R115 will be de-energized at 270° machine time when the contacts P3 break.

At the end of the second cycle as shown in FIG. 2*b*, the relays R114, R101, R118, R120 and R109 will all be energized. Although the punch interposer timing is shown only at the bottom of the seventh cycle, FIG. 2*d*, it is to be understood as operating to effect punching for each key operation cycle.

When the 7 key 60 is depressed by the operator to commence the third cycle, the corresponding 7 interposer magnet 188 (FIG. 1*a*) will be energized causing the program card to escape to column four, while the detail card will escape to column three in a manner as previously described. When the program card escapes to column four the relay R116 will be de-energized, while the #6 star wheel will sense the "6" perforation in the fourth column of the program card. The sensing of the "6" perforation will cause the energization of the relay R121 (FIG. 1*d*) which, in turn, through the closing of the corresponding column of contacts in FIG. 1*b*, will cause preparation for a times 4 style of matrix operation. The #12 star wheel will cause a hold circuit for relay R101 as before.

Likewise when the 7 key 60 is depressed, a circuit will be established from line 11 (FIG. 1*a*) as follows: contacts R3*c* now closed, contacts 356 normally closed, 7 key contacts 363 now closed, R101*i* now closed, wire 320 (FIG. 1*b*) normally closed R117*g*, R122*g*, R121*g*, shifted R120*g*, wire 321, normally closed contacts R116*b* and the "2" value line 322.

Up to this point, the multiplier matrix of FIG. 1*b* has treated the incoming 7 value as multiplied by 5, and then the resulting 35 is diminished by casting out elevens so that there is a deduction of 33 and the result is $35-33=2$ which is the value represented by the line 322 now to be considered as a pulse enters the adding matrix of FIG. 1*c*. Starting at the left of FIG. 1*c* with line 322, a circuit includes normally closed contacts R102*b*, R112*d*, R111*d*, R110, shifted contacts R109*d* (representing the 8 previously calculated) wires 324 and 325 the two rectifiers 39 thereon leading to wires 52 and 63, the former an "8" wire, and the latter a "2" wire. There is established a parallel circuit consisting of conductor 52 (FIGS. 1*c* to 1*e*), relay R104 and line 53; also conductor 63 (FIGS. 1*c* to 1*e*), relay R106, line 64 and conductor 42, and then to the line 14. A hold circuit for these storage relays will be established when the cam controlled contacts P8 make. When the cam controlled contacts P2 break, the relay R109 will be de-energized as shown near the bottom of the timing diagram of FIG. 2*b*.

Thus it is to be noted that the weighted total of the first three digits of the serial number, with a 10 value having been substituted for the first three digits, is now temporarily entered in the relays R104, and R106 which are respectively representative of the values 8 and 2, equal to the sum of 10.

In order to summarize the operations thus far accomplished, it will be recalled that the full sample number is 127485 and up to this point the operations have been detailed with respect to the first three digits 127. What has been done may be shown in a simplified fashion as follows:

| Digit weighting by multiplier | | weighted number | | cast out | | running total added | | net check symbol calculation |
|---|---|---|---|---|---|---|---|---|
| 1x7 | = | 7 | - | 0 | = | 7+0 | = | 7 |
| 2x6 | = | 12 | - | 11 | = | 1+7 | = | 8 |
| 7x5 | = | 35 | - | 33 | = | 2+8 | = | 10 |
| what is yet to be done is as follows: | | | | | | | | |
| 4x4 | = | 16 | - | 11 | = | 5+10 | = | 4 (i. e. 15-11) |
| 8x3 | = | 24 | - | 22 | = | 2+4 | = | 6 |
| 5x2 | = | 10 | - | 0 | = | 10+6 | = | 5 (i. e. 16-11) |

Therefore, the final result is 5 which is the check symbol to be punched in the seventh cycle and thereafter appended or suffixed to the number which is then self-checking as 1274855.

Since the first three cycles have been set forth in considerable detail, it is thought in order to avoid repetition and reduce the size of this specification by setting forth an abbreviated form of explanation of the fourth, fifth and sixth cycles, already noted as involving key operations 4, 8 and 5 in succession.

For the fourth cycle, the program card has a 6 hole (FIG. 1*d*) which picks up relay R121 for the times 4 control which is effective when 4 key contacts 366 (FIG. 1*a*) are closed. This produces the multiplication and casting out control in FIG. 1*b* wherein the incoming "4" wire 327 effects control through the matrix and over to the right on the outgoing "5" wire 328. In the summation matrix FIG. 1*c*, the incoming "5" wire 328 is threaded through (shifted R111 and R109) with the result on the outgoing "4" wire 71 and over in FIG. 1*e* to the related storage and transfer relays R105 and R110.

For the fifth cycle, the program card has a 5 hole which picks up the relay R122 for the times 3 control which is operated when the 8 key contacts 362 are closed. In FIG. 1*b* the incoming "8" wire 328 enters control through the matrix of bistable devices and appears at the right on the outgoing "2" wire 322. In matrix, FIG. 1*c*, the incoming "2" wire 322 exercises directional control with the result through shifted contacts of relay R110 and on the outgoing "6" wires 63 and 71 and over to FIG. 1*e* to the related storage relays R105 and R106, and the related transfer relays R110 and R111.

For the sixth cycle, the program card has a 4 hole which controls to pick up relay R117 for the times 2 control which is operated when the 5 key contacts 365 are closed. In FIG. 1*b*, the incoming "5" wire 331 enters control through the matrix of bistable electrical switch contacts and shifted R117 and appears at the right on the outgoing "X" (10) wire 332. In matrix, FIG. 1*c*, the incoming "X" wire 332 starts a path through the shifted contacts of relays R110 and R111 and on to the outgoing "5" wires (4+1) 71 and 40, and over to FIG. 1*e* to the related storage relays R105 and R107, and the related transfer relays R110 and R112 to set up connections for 4+1 and the check symbol 5.

At 270° of the sixth cycle the keyboard restore magnet will not be de-energized as previously. Instead it will be retained in an energized state by the contacts R116*k*, R117*i* and R114*b* (FIG. 1*d*). At 270° of the sixth cycle when the cam controlled contacts P8 break, the relays R104, R105, R115 and R118 will be deenergized. When the relay R118 becomes de-energized, the contacts R118*b* (FIG. 1*a*) are returned to a normally closed position thereby enabling a circuit to be established for energizing the test relay R103 (FIG. 1*a*). This circuit may be traced as follows: line 11 (FIG. 1*e*), conductor 16, contacts R1*d* normally closed, conductor 36 (FIGS. 1*e* to 1*a*), contacts 116*a* now closed, R117*c* now closed, R118*b* normally closed, relay R103 and conductor 31, to the line 14. When the relay R103 becomes energized, the hold circuit established for the relay R101 through contacts R103*a* (FIG. 1*a*) will be broken, thus returning the relay R101 (FIG. 1*a*) to a de-energized state.

After the relay R103 has been energized, a hold circuit will be established by the cam controlled contacts P8. This circuit may be traced from conductor 16 (FIG. 1*e*) as follows: contacts R1*d* normally closed, conductor 36, cam controlled contacts P8 now closed, line 21, conductor 74 (FIGS. 1*e* to 1*a*), contacts R103*i* now closed, the hold coil of the relay R103, conductor 75, to the conductor 14. With the relay R103 being energized, the associated contacts R103*c* (FIG. 1*d*) will close thereby enabling a circuit to be established through contacts R114*c* (FIG. 1*d*) for energizing the tube T14 (FIG. 1*e*), which in turn will cause the relay R26 (FIG. 1*e* here —FIG. 47*c* in the Gardinor patent) to be energized. As pointed out in the Gardinor patent and which is not shown in this application, a hold circuit will be established for the relay R26 (FIG. 47*c* of the Gardinor patent) which will energize the tube T6 and as a result hold the relay R26 in an energized condition. With the cam controlled contacts P2 in a make position and the contacts R26*d* (FIG. 47*c* of the Gardinor patent) now closed, a circuit will be established for energizing the relay R2, FIG. 1*e*. The relay R2 will be held by its contacts R2*c*. The energization of the relay R2 closes the contacts R2*a* (FIG. 47*c* of the Gardinor patent) thereby enabling a circuit to be established for energizing the punch clutch magnet 204.

The energization of the punch clutch magnet will initiate another cycle, the seventh cycle, but it will not be accompanied by an escapement. In the seventh cycle when the cam controlled contacts P3 make at 10°, the values standing in the transfer storage relays R110 and R112 will be transferred to the relays R105 and R107. The circuit enabling this transferring operation to take place may be traced from the cam controlled contacts P3 conductor 77 (FIG. 1*a*) as follows: conductor 32, contacts R103*h* shifted, R114*e* shifted, conductor 78 (FIGS. 1*a* to 1*c*), R112*b* shifted, R110*c* shifted, conductor 79, parallel circuit consisting of line 71 (FIGS. 1*c* to 1*e*), relay R105 and line 53, and line 40 (FIGS. 1*c* to 1*e*), relay R107 and line 70, conductor 42, to the conductor 14. A hold circuit will be established by the cam controlled contacts P8 through contacts associated with these relays.

Likewise when the cam controlled contacts P3 make at 10° of the seventh cycle, a circuit will be established through contacts R2*b* to energize the relay R25 (FIG. 47*c* of the Gardinor patent). When the cam controlled contacts P2 break at 85° of the seventh cycle the relays R110, R112 and R2 will be de-energized.

At 86° of the seventh cycle, the cam controlled contacts P5 will make thereby enabling a circuit to be established for reading out the value stored in the relays R105 and R107. This circuit may be traced from the cam controlled contacts P5 conductor 33 (FIG. 1*a*) as follows: contacts R114*d* now closed, R103*e* now closed, R104*c* as shown, R105*c* shifted, R106*d* as shown, R107*e* transferred, conductor 80, the "5" interposer magnet 188, conductor 34, and then to the conductor 14. The energization of the 5 interposer magnet 188 will, as now understood, initiate a normal punch cycle which will result in the key number 5 being punched in the seventh column of the record card.

It has been seen how the key or check number is originated by the applicant's device. The manner in which a previously prepared serial number having a key or check number appended thereto is checked for accuracy will now be described. It does not necessarily follow that a number and check symbol as originated is immediately checked as noted here. In most instances checking of the serial number is a continuous process, as in the checking of account numbers in a continuous billing operation.

The initial step taken in preparing the applicant's circuit for a checking operation is that of opening the switch 20 (FIG. 1*e*) so as to prevent the relay R114 from being energized. It is recalled that the switch 20 is closed during an operation for originating the key number.

Figure 2D:
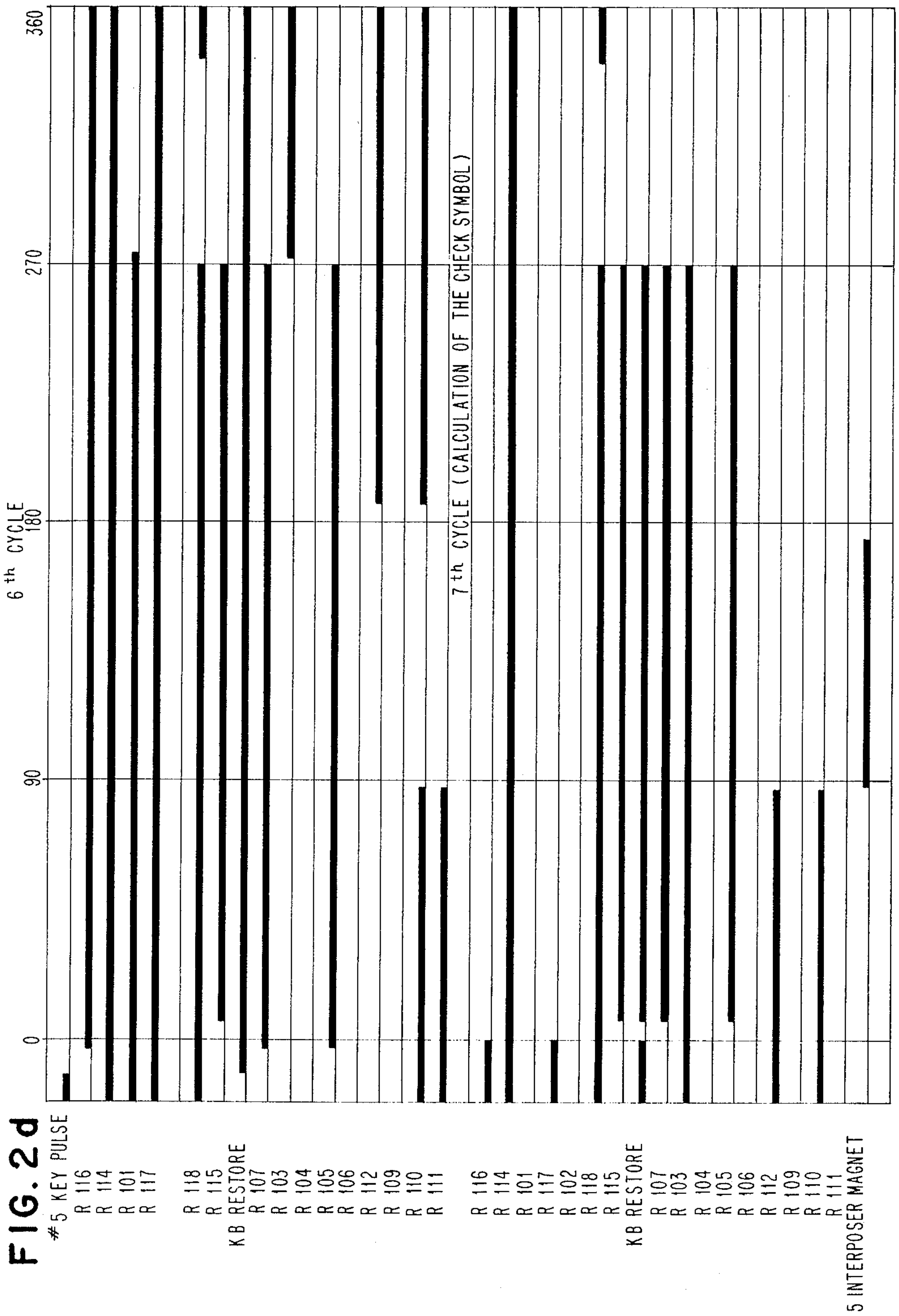

Similarly to that as previously described, the first six digits are successively keyed in resulting in the relays R110 and R112 (FIG. 1*e*), jointly representative of the value 5, and the test relay R103 (FIG. 1*a*) being energized such as shown in the timing diagram of FIG. 2*d*. Inasmuch as the relay R114 is de-energized during this checking operation, the relay R101 (FIG. 1*a*) will still be held in an energized condition through the normally closed contacts R114*a* and the now closed contacts R101*a* (FIG. 1*a*). Likewise with relay R114 in a de-energized condition, a punch clutch cycle will not be initiated at the time the relay R103 becomes energized, as was the case in the originating operation, inasmuch as the normally open contacts R114*c* (FIG. 1*d*) will prevent a circuit from being completed to the tube T14 (FIG. 1*e*).

The subtraction control relay R102 (FIG. 1*a*) is picked up when relay R114 is prevented from being energized as an indication of selection of a checking operation as noted before. However, relay R102 is not made operative immediately but called in when the usual circuit for the test relay R103 (FIG. 1*a*) is activated as noted hereinbefore. The circuit may be traced as follows: line 11 (FIG. 1*e*), conductor 16, contacts R1*d* normally closed, conductor 36 (FIGS. 1*e* to 1*a*) contacts R116a now closed, contacts R117*c* now closed, contacts R114*g* remaining closed when R114 is disabled by pulling switch 20, relay R102, and line 14.

The seventh cycle in the checking operation will be initiated by depressing the 5 key 66 (FIG. 1*a*), representative of the check digit, which will cause the units digit of the serial number to be punched in the card, as well as being subtracted from the total standing in the relays R110 and R112. If the serial number is correct the resulting total will energize the top line 333, FIG. 1*c*, and lines 50, 63 and 40 as represented by the relays R104, R106 and R107 representative of 8, 2 and 1, i.e., the relay values totaling 11 is indicative of a zeroizing condition. But if the serial number entered is incorrect, the same relays (FIG. 1*c*) will not be energized while the error relay R113 (FIG. 1*c*) will be energized resulting in further operations being halted.

Now the depressing of the 5 key 66 (FIG. 1*a*) will close the corresponding contacts 365 causing a pair of circuits to be established. The first circuit will cause the 5 interposer magnet 188 to be energized which, in turn, will cause the program card to skip to column eight and the record card to column seven, as well as initiating a punch clutch cycle resulting in a "5" being punched in column seven of the record card. Since the program card is blank in column eight, the relay R101 will (FIG. 1*a*) be returned to a de-energized condition.

The second circuit established when the 5 key 66 is depressed may be traced from the corresponding now closed contacts 365 (FIG. 1*a*) as follows: contacts R101*g* now closed, line 331 (FIG. 1*a* to FIG. 1*b*), with all multiplier relays down the connection will be straight through to wire 328 (FIG. 1*b* to FIG. 1*c*).

It will be recalled that in FIG. 1*c* the subtracting or complementing relay R102 is now effective and the contacts R102*e* are shifted. Continuing the circuit (for the 5 check symbol as compared with the calculated 5) from the "5" line 328, through the shifted R102*e*, shifted lower contacts R112*h* (the calculated 5 is represented by 1 and 4, namely relays R112 and R110) normal contacts R111*i*, shifted lower contacts R110*i*, wire 335 to the top or zero line and then through normal contacts R109*b* to the check wire 333 and the three rectifiers on lines 40, 63 and 52 representative of the values 1, 2 and 8 or a distinctive 11, the three lines extend through FIG. 1*d* and into FIG. 1*e* where they serve to pick up relays R104, R106 and R107, wire 42 to line 14. Hold circuits for the three relays are established through their contacts and cam contacts P8. Thus the error free matching condition is indicated by a zeroizing condition calling in the operation of relays for setting up an "11" condition which is the condition preventing operation of the error indicating relay R113 shown in the upper left side of FIG. 1*e* as having all three relay contacts R104*d*, R106*f*, and R107*i* normally closed and in parallel and all in series with R113 so that an "11" condition must prevail at testing time to prevent it from being energized. Also in parallel are contacts R105*d* normally open, and must stay so to indicate error free operation. The 8, 2, 1 relay combination is used to represent the zero balance in order to prevent a validity check by an undisturbed zero, i.e., prevent control by failure of all selected relays to pick up.

If the relays R104, R106 and R107 are not energized at this time of the seventh cycle, thereby indicating that the serial number keyed in its incorrect, then when the cam controlled contacts P3 make at 10°, a circuit will be completed for energizing the error relay R113 (FIG. 1*e*). This circuit may be traced from the line 77 (FIG. 1*e*) which is coupled to the cam controlled contacts P3 as follows: conductor 87 (FIG. 1*e*), contacts R103*d* now closed, any one or more closed contacts R104*d*, R105*d*, R106*f* or R107*i*, normal R114*f*, pick-up coil of the error relay R113, conductor 88, and then to the line 14. A hold circuit for the error relay R113 is set up through the contacts R1*d*, wire 36, and R113*e*(FIG. 1*e*). The completion of the hold circuit for relay R113 will also cause the lamp 89 to light thereby visually indicating an error. When the error relay R113 is energized, the contacts R113*c* (FIG. 1*e*) open which will interrupt all program signals until the error has been cleared.

During the seventh cycle of the checking operation, any value standing in the storage relays R104, R105, R106 and R107 (FIG. 1*e*) will not be transferred to the corresponding one of the transfer storage relays R109, R110, R111, and R112 (FIG. 1*e*) when the cam controlled contacts P6 make inasmuch as the contacts R103*g* (FIG. 1*e*) will be open at this time.

In order to release a record card in which an erroneous serial number has been punched, the operator will close the error release key 92 (FIG. 1*e*) which will enable a circuit to be established through the now closed contacts R113*e* (FIG. 1*e*) for energizing the relay R119 (FIG. 1*e*). The energization of the relay R119 will close the contacts R119*b* thereby enabling an obvious circuit to be established for energizing the release relay R1 and the contacts R119*a* (FIG.1*e*) for setting up a hold circuit for the relay R119 through the now closed contacts PR3. The contacts PR3, as described in the Gardinor patent are normally closed until the program drum has been advanced a column and a half past the 80th column position when they are opened and then restored six and a half columns later. The energization of the release relay R1 will cause the card to escape through column 80 in a manner such as described, in the Gardinor patent.

The energization of the release relay R1 will open the contacts R1*d* (FIG. 1*e*) causing the relays R103 (FIG. 1*a*) and R113 (FIG. 1*e*) to be de-energized. The breaking of the contacts PR3 will break the hold circuit for the card lever relay R3, the relay R119 and relay R1 (FIG. 1*e*) thereby restoring these relays to a de-energized state.

As noted hereinbefore, relay R101 is picked up before the first key operation by the program selection of relay R116 and a "top" circuit R116*a*, R120*j*, etc., to the grid of tube T21 which controls relay R101. A secondary circuit, or middle circuit from the normally open R116*a* to R117 is made effective sequentially after the initial operation by any one of the ×5, ×4, or ×3 relays in closing R120*j*, R121*j* or R122*j*. A "lower" or program end circuit is at the bottom of all normally closed contacts R116*a*, R120*k*, etc., and becomes effective upon the closure of the 2 times relay R117*a* contacts to sustain the checking field definition control of relay R101 over the first series of multipliers and a second series of multipliers may be used directly thereafter by again calling in relays R116, R120, etc. When the program card is blank in a selected column, the relay R101 will be de-energized.

At the time that the contacts PR3 (FIG. 1*e*) break, the contacts PR2 make to establish a circuit through the normally closed contacts R113*c* and R23*b* (FIG. 1*e*) to the control grid of the tube T5 (FIG. 1*e* here—FIG. 47*c* of the Gardinor patent). The completed circuit will render the tube T5 conductive causing the relay R24 to be energized resulting in an automatic releasing of the erroneous punched card in the manner as described in the Gardinor patent. It is to be noted that the contacts R113*c* in this circuit will prevent an automatic release of the card whenever an error should occur in column 80. As soon as the error is detected, the error relay R113 will be energized causing the contacts R113*c* to open thus preventing an automatic release of the record card in such a situation.

While the invention has been particularly shown and described with reference to a preferred embodiment thereof, it will be understood by those skilled in the art that various changes in form and details may be made therein without departing from the spirit and scope of this invention.

What is claimed is:

1. In a checking apparatus, a multiplying means, means for entering a series of digits into said multiplying means, means for weighing said entered digits by a series of programmed multipliers starting with a large prime digit and progressing in a descending order of multiplier digit value, means for programming entry of said multiplier values, means under control of said multiplying means for storing the units order digits of the products of said weighting multiplications, and means under control of said storing means for indicating a final summated check symbol digit related to said series of entered digits.

2. In a checking device involving calculations to the base 11, matrix devices for creating a decimal check digit symbol by weighting entered decimal digits by multipliers and adding the products with 11's cast out, means for entering a series of decimal digits into said matrix devices, means under control of said matrix devices for storing a check symbol in preliminary four bit binary coded decimal form, and output means under control of said storing means for indicating said check symbol as a decimal digit.

3. The checking device set forth in claim 2 with means for checking a number involving a series of decimal digits and their check symbol digit, comprising means for comparing the results of calculations in said matrix devices by the series of decimal digits with the value of said check symbol, means under control of said comparing means for indicating a correct zeroizing condition by storing binary indications of the bits 8, 2 and 1, error signal means, and means under control of said indicated 11 condition means for preventing an operation of said error signal means from being initiated.

4. In a calculating machine for testing a number and a related existing check symbol, the combination of means for entering said number as a multidigit amount in said machine, means for calculating successively lower multiples of each successive digit with 11's cast out of the products, means for determining the summation of the calculated digit products with 11's cast out, as a calculated check symbol, means for obtaining the complement of said summated check symbol, and means for comparing said complement with said existing check symbol formed previously the same way to determine if they agree.

5. In a calculating machine, the combination of electrical multiplication and summation circuits, means to enter an amount and form digitally successive multiples thereof in said multiplication circuit, means controlled by said multiplication circuit to control the summation circuit for casting out 11's of the products and casting out 11's of the sums of the treated products, and means controlled by said last mentioned means for producing a self-checking value for said amount.

6. In a calculating machine, the combination of an electrical summation circuit, means for entering an amount into said circuit, means for modifying said entered amount by multiplying successive digits to form products by different graduated multipliers, means under control of said modifying means for registering the summation of said products with 11's cast out, and means controlled by said last mentioned means for producing a self-checking value for said amount, the sum of the complement of said self-checking value and said summation being zero.

7. In combination, a group of entry receiving devices, means for successively entering the digits of a multidenominational amount in said devices, the highest order and successive digits being weighted by multiplications by 7, 6, 5, 4, 3, 2 and repetitions thereof sequentially, said devices progressively registering the products of said multiplications less 11's cast out and means controlled by said devices for reading out the last units sum as a check symbol standing in said devices after the last digit of said amount has been entered into said devices.

8. In a calculating machine, a set of settable devices comprising a plurality of relays representing respectfully the numbers 8, 4, 2 and 1, means for successively entering a multiple denominational amount digit by digit in said devices, means prior to the entry of said amount in said devices for weighting said digits by multiples of 7, 6, 5, 4, 3, 2 and repetitions thereof, the products of each of said weighted sums being lessened by casting out 11's, said devices progressively adding the units sum of said weighted and lessened products with 11's again cast out of said sums, and means controlled by said relay devices upon the entry of the last digit of said amount for reading out and recording as a check symbol the units sum standing in said devices.

9. In a calculating and punching machine, a set of settable devices comprising a plurality of relays representing respectfully the binary values 8, 4, 2 and 1, punching devices, means for successively entering a multiple dennominational amount digit by digit in said punching and relay devices, means prior to the entry of said amount in said relay devices for weighting said digits by multiples of 7, 6, 5, 4, 3, 2 and repetitions thereof, the products of each of said weighted sums being lessened by casting out 11's, said devices progressively adding the units sum of said weighted and lessened products with 11's again cast out of said sums, and means controlled by said relay devices upon the entry of the last digit of said amount for reading out and controlling said punching devices to punch the units sum standing in said devices as a check symbol digit to the right of the other punched digits comprising the multiple denomination amount.

10. In apparatus for forming and punching a number and its check symbol, punch operating means, a key operated set and transfer set of settable devices, means for successively entering a numerical value digit by digit in said key operated devices, program means for multiplying the successively entered digits by 7, 6, 5, 4, 3, and 2, and casting out 11's from the products, a storage set of settable devices, summation circuit means jointly controlled by said program multiplier and said transfer devices, circuit connections interconnecting said summation means with said storage devices for progressively registering the units digit of the sum of the amount entered in said program and transfer devices with 11's cast out, means for transferring said progressive sum to said transfer devices following the entering of each digit in said program multiplier devices, means under the control of said program means for transferring back to said storage devices the sum entered in said transfer devices after the last digit of said value has been entered in said program devices, and means controlled by said storage devices following the transferring back of said sum for effecting the operation of said punch means in accordance with the value of the transferred back sum which is the check symbol.

11. In an apparatus of the class described, a first entry receiving device comprising a plurality of settable elements respectively representative of the values 1, 2, 3, 4, 5, 6, 7, 8 and 9, means for successively entering a numerical value digit by digit in said receiving device, program means for converting the successive digits of said value entered in said device pursuant to a weighted multiple plan of forming successive products of multiples of 7, 6, 5, 4, 3 and 2, the product having 11's cast out, a first and second set of settable devices each having a group of contacts, said group of contacts of said second set being interconnected in accordance with a table of addition with elevens cast out, said interconnecting means extending to said first devices, said first devices registering progressively after each digit entry in said receiving device the units digit of the sum of said first device and said second devices, and means for successively transferring to said second devices the sum registered in said first devices.

12. A self-checking numbering device for calculating and verifying numbers having an appended check symbol, said numbers providing means for detecting errors of insertion of one or more wrong digits and transposition of any two or more adjacent or nonadjacent digits in a group of digits said group having a check symbol which is the remainder resulting from dividing the sum of the products of different multiples for each different denomination, said multiples differing as to numeric weight and all divided by the modulus 11, said multiple weights being 7, 6, 5, 4, 3, 2 and successive repetition thereof for longer numerals, comprising computing means involving a matrix of relay contacts intermediate decimal input and elevens output lines, said contacts being arranged to multiply any incoming decimal digit by 7, 6, 5, 4, 3, 2 and also cast out 11's from the product and put the result on an outgoing elevens value line, said computer comprising further a secondary matrix of relay contact elements for summation purposes whereby binary additions are performed with respect to calculated portions of a check symbol in binary notation merged with an incoming portion of a check symbol as an elevens value to provide a running balance of calculated binary value representing a current binary value of a calculated check symbol, said summarizing matrix being intermediate incoming elevens value lines and outgoing binary lines, said computer further comprising two sets of binary storage relays one for holding the running balance as the binary representation of a calculated check symbol and the other set of relays providing a feed back storage transfer medium for forwarding said running balance check symbol calculation from the storage relays to said summarizing matrix so that incoming symbol calculations are added to previous calculations to form a new balance as a current check symbol calculation, recording means for appending a calculated check symbol to the group of digits of a number set up serially on a keyboard, and verifying means operable in connection with the aforementioned calculating means for comparing and checking a symbol calculation as performed by the aforementioned devices and comparing the same with the previously formed check symbol which is last to be entered upon testing a number and, upon lack of concurrence, to provide a visual error indication and affect the operation of the recording means to indicate an error existing in a number as compared with an appended check symbol.

13. A self-checking numbering device for calculating numbers having an appended check symbol, said numbers providing means for detecting errors of insertion of one or more wrong digits and transposition of any two or more adjacent or nonadjacent digits in a group of digits, said group having a check symbol which is the remainder resulting from dividing the sum of the products of different multiples for each different denomination said multiples differing as to numeric weight and all divided by the modulus 11, said multiple weights being 7, 6, 5, 4, 3, 2 and successive repetition thereof for longer numerals, comprising computing means involving a matrix of bistable elements intermediate decimal input and elevens output lines said bistable elements being arranged to multiply any incoming decimal digit by 7, 6, 5, 4, 3, 2 and also cast out 11's from the product and put the result on an outgoing elevens value line, said computer comprising further a secondary matrix of bistable elements for summation purposes whereby binary additions are performed with respect to calculated portions of a check symbol in binary notation merged with an incoming portion of a check symbol as an elevens value to provide a running balance of calculated binary value representing a current binary value of a calculated check symbol, said summarizing matrix being intermediate incoming elevens value lines and outgoing binary lines, said computer further comprising two sets of binary storage devices one for holding the running balance as the binary representation of a calculated check symbol and the other set of devices providing a feed back storage transfer medium for forwarding said running balance check symbol calculation from the storage devices to said summarizing matrix so that incoming symbol calculations are merged with previous calculations to form a new balance as a current check symbol calculation.

14. A self-checking numbering device for verifying numbers having an appended check symbol, said symbol providing means for detecting errors of insertion of one or more wrong digits and transposition of any two or more adjacent or nonadjacent digits in a group of digits, said group having a check symbol which is the remainder resulting from dividing the sum of the products of different multiples for each different denomination said multiples differing as to numeric weight and all divided by the modulus 11, said multiple weights being 7, 6, 5, 4, 3, 2 and successive repetition thereof for longer numerals, comprising computing means involving a matrix of bistable elements intermediate decimal input and elevens value output lines said bistable elements being arranged to multiply any incoming decimal digit by 7, 6, 5, 4, 3, 2 and also cast out 11's from the product and put the result on an outgoing elevens value line, said computer comprising further a secondary matrix of bistable elements for summation purposes whereby binary additions are performed with respect to calculated portions of a check symbol in binary notation merged with an incoming portion of a check symbol to provide a running balance of calculated binary value representing a current binary value of a calculated check symbol, said summarizing matrix being intermediate incoming elevens value lines and outgoing binary lines, said computer further comprising two sets of binary storage devices one for holding the running balance as the binary representation of a calculated check symbol and the other set of devices providing a feed back storage transfer medium for forwarding said running balance check symbol calculation from the storage relays to said summarizing matrix so that incoming symbol calculations are merged with previous calculations to form a new balance as a current check symbol calculation, and verifying means operable in connection with the aforementioned calculated means for comparing and checking a symbol calculation as performed by the aforementioned devices and comparing the same with the previously formed check symbol which is last to be entered upon testing a number and, upon lack of concurrence to provide an indication of an error existing in a number as compared with an appended check symbol.

References Cited in the file of this patent

UNITED STATES PATENTS

| | | |
|---|---|---|
| 2,099,754 | Robinson | Nov. 23, 1937 |
| 2,346,616 | Saxby | Apr. 11, 1944 |
| 2,653,761 | Lawrence et al. | Sept. 29, 1953 |
| 2,731,199 | Ghertman et al. | Jan. 17, 1956 |
| 2,805,824 | Knutsen | Sept. 10, 1957 |
| 2,857,100 | Franck et al. | Oct. 21, 1958 |
| 2,869,784 | Thomas | Jan. 20, 1959 |
| 2,873,914 | Hebel | Feb. 17, 1959 |
| 2,886,239 | Reumerman et al. | May 12, 1959 |
| 2,886,240 | Linsman | May 12, 1959 |
| 3,028,087 | Walton | Apr. 3, 1962 |